United States Patent
Arya et al.

(10) Patent No.: US 12,254,486 B1
(45) Date of Patent: Mar. 18, 2025

(54) INTERACTIVE VOICE CAPABILITIES FOR PROSPECT DIGITAL ACQUISITION

(71) Applicant: American Express Travel Related Services Company, Inc., New York, NY (US)

(72) Inventors: Neha Arya, New York, NY (US); Xiangzhen Kong, Hoboken, NJ (US); Hemalatha Krishnamurthy, Phoenix, AZ (US); Venkatesh Nagarajan, Scottsdale, AZ (US); Andy Ruan, San Francisco, CA (US); Robert Santoro, Phoenix, AZ (US); Maheshwar Singh, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 17/646,494

(22) Filed: Dec. 30, 2021

(51) Int. Cl.
*G06Q 30/0207* (2023.01)
*G10L 15/22* (2006.01)
*G10L 15/30* (2013.01)

(52) U.S. Cl.
CPC .......... *G06Q 30/0236* (2013.01); *G10L 15/22* (2013.01); *G10L 15/30* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 2003/0154162 A1* | 8/2003 | Danaher | G06Q 30/02 705/38 |
| 2019/0087848 A1* | 3/2019 | Koltnow | H04W 4/14 |
| 2019/0378499 A1* | 12/2019 | Miller | G10L 15/22 |
| 2020/0169552 A1* | 5/2020 | Siddiqui | H04L 63/0807 |

OTHER PUBLICATIONS

Voice-Recognition Applications: Financial Services, by Drew Allen & Connor Huffman. Available at: https://www.credera.com/insights/voice-recognition-applications-financial-services (Year: 2018).*

* cited by examiner

*Primary Examiner* — Katherine Kolosowski-Gager
(74) *Attorney, Agent, or Firm* — Thomas Horstemeyer LLP

(57) ABSTRACT

Disclosed are various embodiments for using a voice-enabled application for prospect digital acquisition. In some embodiments, a system comprises a computing device and machine-readable instructions. The instructions, when executed, cause the computing device to identify a command from a first utterance provided by a voice-enabled service. The command includes an instruction to provide content associated with opening a transaction account at a transaction account service. An audio prompt can be selected based at least in part on the command. The audio prompt is transmitted to the voice-enabled service. A second utterance is received from the voice-enabled service. The computing device transmits a content request for opening the transaction account to a computing environment associated with the transaction account service. Content for opening the transaction account is received from the computing environment. Audio content is transmitted to the voice-enabled service for playback.

20 Claims, 4 Drawing Sheets

INTERACTIVE VOICE CAPABILITIES FOR PROSPECT DIGITAL ACQUISITION

BACKGROUND

Companies use an array of channels for presenting promotional content to customers. Internet of Things (IoT) devices have changed the manner in which individuals consume content. For example, mobile phones, tablets, and smart watches provide convenient methods for individuals to consume content and features for interacting with the content. Overtime, the interactive capabilities of IoT devices have developed to improve the user experience.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to using voice-enabled applications for prospect digital acquisition. In some examples, the voice-enabled applications can be used, via Internet of Things (IoT) devices, for providing promotional content and activating a service or an account in response to accepting the promotional content. For instance, a user can verbally ask an IoT device (e.g., a smart speaker) for promotional offers being offered by a financial institution. The IoT device can respond with a request for personal information. The user can verbally provide the personal information (e.g., first name, last name, mailing address, employment status, income, etc.) to the IoT device. The IoT device can initiate a query for promotional offers tailored for the user based on the personal information provided. After completing the query, the IoT device can verbally recite one or more promotional offers based on the user's financial situation, credit profile, or other suitable factors. In some instances, the user can accept one of the promotional offers, such as to sign-up for a credit card with the financial institution. In other instances, the user can instruct the IoT device to send the promotional offers to an email address.

Thus, the embodiments of the present disclosure relate to various improvements related to using voice-enabled applications for digital acquisition of web-based services. For example, the embodiments of the present disclosure are directed to improved approaches that enable a voice-enabled application to interface with a prospect acquisition service and enable a dialogue module that securely manages confidential information captured in an audible manner, in which the confidential information is used for processing a requested task.

In the following discussion, a general description of the system and its components is provided, followed by a discussion of the operation of the same.

Figure 1:
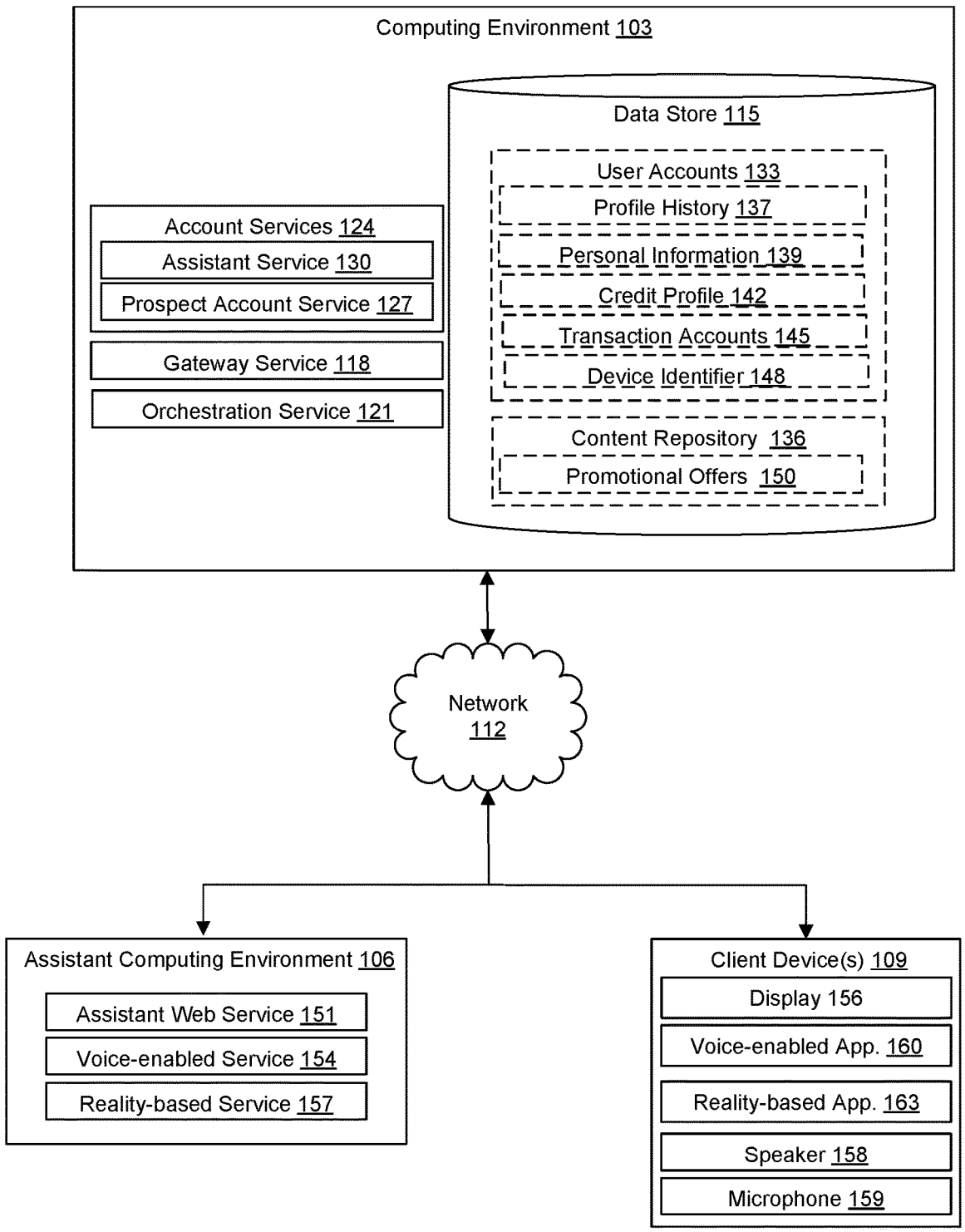
FIG. 1 is a drawing of a networked environment according to various embodiments of the present disclosure.

With reference to FIG. 1, shown is a networked environment 100 according to various embodiments. The networked environment 100 includes a computing environment 103, an assistant computing environment 106, and a client device 109, which are in data communication with each other via a network 112. The network 112 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed on the computing environment 103, for example, include a gateway service 118, an orchestration service 121, account services 124, and other applications, services, processes, systems, engines, or functionality not discussed in detail herein. The gateway service 118 is executed to provide a web interface to external computing systems. The gateway service 118 can be executed to authenticate devices and device communication associated with the computing environment 103. The gateway service 118 can execute a set of authentication rules, a whitelist of authorized devices, and other authentication functionality. After authentication has occurred, the gateway service 118 can transmit the data communication to the orchestration service 121.

The orchestration service 121 can be executed to route data communication from the gateway service 118 to the appropriate account service 124. In some instances, the orchestration service 121 can use a set of application programming interfaces for the account services 124. Additionally, the orchestration service 121 can modify data communication from the gateway service 118 in a format that is appropriate for one or more of the account services 124. For example, an account service 124 may require certain data fields, data in a particular format, and other suitable data criteria. The orchestration service 121 can modify data communication (e.g., content requests, instructions) to comply with the data criteria for each account service 124. In some embodiments, the functionality of the orchestration service 121 can be embedded into the gateway service 118.

The account services 124 can represent one or more services of the computing environment that can be accessed by the assistant computing environment 106. Some non-limiting examples of account services 124 can include a prospect account service 127, an assistant service 130, and other suitable services.

The prospect account service 127 can be executed to provide content (e.g., promotional content) to new and existing users about potential services associated with the computing environment 103. The content can be provided to inform the users about new services. The prospect account service 127 can also generate a new account or activate a new service for users in response to instructions provided by the users. For example, the prospect account service 127 can generate promotional content (e.g., a limited time promotional offer) for a credit card account that is tailored to the credit profile of user. If the user decides to accept the promotional offer, the prospect account service 127 can generate the new credit card account according to the terms of the promotional offer. In another example, the existing user can be informed of a new service and the prospect account service 127 can activate the new service for the existing user after receiving user instructions.

The assistant service 130 can be executed to provide content to existing users. The content can include subject matter related to the account status, account benefits, and other suitable account content. The assistant service 130 can also be used for redeeming reward points (e.g., for travel accommodations, flights, products, etc.), making purchases, and other suitable transactions.

The data stored in the data store 115 includes, for example, a user account 133, a content repository 136 and potentially other data. Each user account 133 can have a unique identifier for each user. The user account 133 can represent data associated with a user in the computing environment 103. Some non-limiting examples of data elements can include a profile history 137, personal information 139, a credit profile 142, transaction accounts 145, a device identifier 148, and other suitable user account data. The profile history 137 can represent a history of user activity with the computing environment 103.

The personal information 139 can represent data that is obtained that uniquely identifies a user. Some examples of personal information 139 of a user can include a first name, last name, salary, employment status, mailing address, marital status, homeowner status, financial income, occupation, social security number (e.g., a portion of the social security number or the entire social security number), and other suitable personal information 139.

The credit profile 142 can represent credit-related information associated with the user, such as a credit history, a credit rating, and other suitable credit-related information. Data for the credit profile 142 can be received from credit bureaus and other credit-related entities. The transaction account 145 can refer to one or more financial accounts (e.g., credit card, debit card, loyalty account) associated with the user.

The device identifier 148 can refer to a unique identifier for each device associated with the user. The device identifier 148 can be assigned to a laptop, a personal computer, an IoT device, a smartphone, a tablet, and other suitable devices. The device identifier 148 can store an array of identifiers for each end devices that has been used to communicate with the assistant computing environment 106. For example, the device identifiers 148 can refer to smart speakers (e.g., Amazon® Echo®, Google® Home™, Apple® HomePod Mini®) that are use virtual assistants, such as (Amazon's Alex®, Google's Assistant™, and Apple's Siri®, etc.).

The content repository 136 can represent content data that are accessible by the account services 124. In some embodiments, the content repository 136 can include promotional offers 150 associated with one or more services.

The assistant computing environment 106 can represent a computing resource environment for operating virtual assistant resources. The assistant computing environment 106 can include an assistant web service 151, a voice-enabled service 154, a reality-based service 157, and other suitable services for virtual assistants.

The assistant web service 151 can operate as an interface with the voice-enabled service 154 and the reality-based service 157. The assistant web service 151 can also interface with computing environment 103. The assistant webs service 151 can perform various natural language processing, such as audio-to-text conversions, voice authentication, identifying user intent from audio or text, and other suitable natural language processing.

In some embodiments, the voice-enabled service 154 or the reality-based service 157 can receive audio captured on the client device 109. The capture audio can include a user intent or command verbally spoken by the user. The assistant web service 151 can receive audio and identify the user intent or instructions (e.g., command) from the audio. The user instructions may include a request to access a particular computing environment and to perform a specific task.

An entity associated with the computing environment 103 can provide a set of software instructions to the assistant computing environment 106 for operating a voice-enabled service 154 and/or the reality-based service 157. The assistant web service 151 can have code (e.g., set of instructions) that instructs the assistant web service 151 can to handle data received from the voice-enabled service 154 or the reality-based service 157.

The assistant web service 151 can receive a set of instructions associated with the computing environment 103. The instructions can direct the assistant web service 151 on how to manage interactions with the voice-enabled service 154, the reality-based service 157, and the computing environment 103. For example, the assistant web service 151 can identify a command from the audio provided by the voice-enabled service 154. The assistant web service 151 can have a set of rules or a workflow that indicates one or more operations to perform if a particular command is detected in the audio.

For example, the user can say "I want to learn about credit card offers." The assistant web service 151 can identify the keywords "credit cards" and "offers." The assistant web service 151 can interpret these keywords as a user intent to inquire about promotional offers 150 for credit card accounts. The keywords or the specified user intent can be associated with a set of instructions. The set of instructions can cause the assistant web service 151 to reply (via the voice-enabled service 154) with an audio prompt for collecting personal information 139 from the user. Once the personal information 139 is collected from the user, the assistant web service 151 can transmit the data request for promotional offers 150 to the computing environment 103. The data request can include the personal information 139.

The voice-enabled service 154 can operate as an interface for voice-enabled applications operating on a client device 109. The voice-enabled service 154 operates to support voice-related application functionality for the computing environment 103. Some non-limiting examples of voice-enabled application can include Amazon Alexa Skills, Google Assistant Actions, and other possible examples.

The reality-based service 157 can operate as an interface for reality-based applications operating on a client device 109. The reality-based service 157 operates to support virtual reality and augmented reality functionality for the computing environment 103.

The client device 109 is representative of a plurality of client devices that may be coupled to the network 112. The client device 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 109 may include a display 156. The display 156 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. The client device 109 can also include a speaker 158 and a microphone 159.

The client device 109 may be configured to execute various applications such as a voice-enabled application 160, reality-based application 163, and/or other client applications. The voice-enabled application 160 can be executed to perform application functionality using the speaker 158 and/or the microphone 159. For example, the voice-enabled application 160 can perform a task based on receiving a verbal command. The voice-enabled application 160 can interface with the assistant computing environment 106 in order to execute its operations.

The reality-based application 163 can be executed to perform application functionality using the display 156, the speaker 158 and/or the microphone 159. The reality-based application 163 can operate to perform virtual reality-based applications and augmented reality-based applications.

The client application may be executed in a client device 109, for example, to access network content served up by the computing environment 103 and/or other servers, thereby rendering a user interface on the display. To this end, the client application may comprise, for example, a browser, a dedicated application, etc., and the user interface may comprise a network page, an application screen, etc. The client device 109 may be configured to execute applications beyond the client application such as, for example, email applications, social networking applications, word processors, spreadsheets, and/or other applications.

Figure 2:
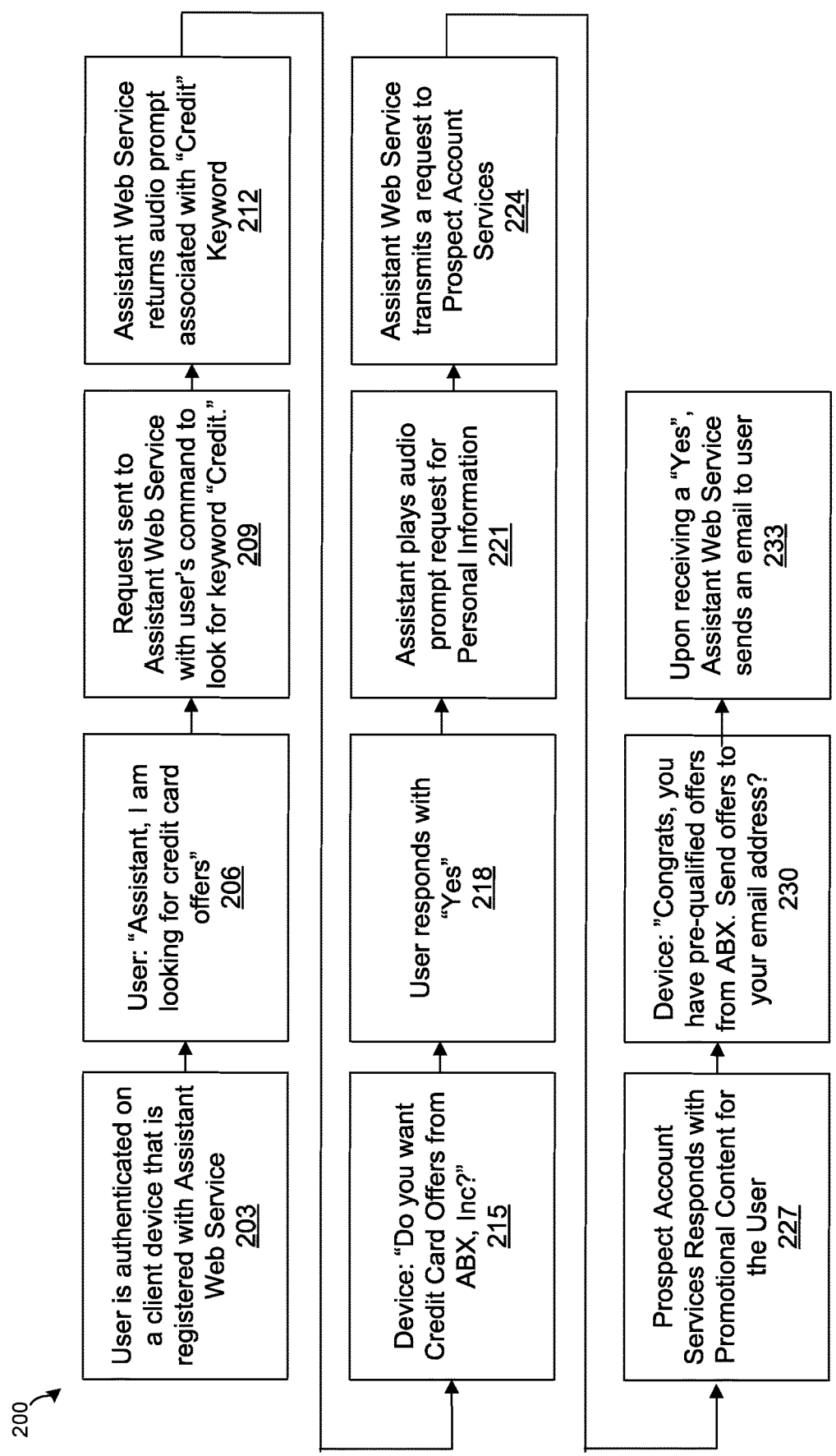
FIG. 2 is an example of a use-case scenario of the networked environment of FIG. 1 according to various embodiments of the present disclosure.

Next, shown in FIG. 2 is an example 200 of a use case scenario that illustrates the operation of the various components of the networked environment 100. To begin, at box 203, the user is authenticated on a client device 109 that has a user account 133 registered with the computing environment 103 (via the assistant web service 151). At box 206, the user says to the client device 109, "Assistant, I am looking for credit card offers." At box 209, a request is generated by the client device 109 and sent to the assistant web service 151 via the voice-enabled service 154. The request includes the audio captured by the client device 109. The assistant web service 151 identifies the command "look" and the keyword "credit."

At box 212, the assistant web service 151 can process the command "look" and the keyword "credit." The assistant web service 151 can identify an audio prompt to confirm the requested task. The audio prompt can be sent from the assistant web service 151 to the voice-enabled service 154, which in turn can relay the audio prompt to the client device 109.

At box 215, the client device 109 can play the audio prompt via the speaker 158 which plays, "Do you want Credit Card Offers from ABX, Inc.?" At box 218, the client device 109 captures the user responding verbally with, "Yes." The response is provided back to the assistant web service 151 via the voice-enabled service 154 and the voice-enabled application 160.

At box 221, the assistant web service 151 instructs the client device 109 to respond with audio prompt of, "Please provide your name and mailing address." The client device 109 captures the name and mailing address spoken verbally by the user. The personal information 139 is relayed to the assistant web service 151.

At box 224, the assistant web service 151 transmits a request to the prospect account service 127. The request includes the personal information 139 and a command for querying promotional offers 150. At box 227, the prospect account services 127 can identify promotional content based on the personal information 139 of the user. Then, the prospect account services 127 can provide the promotional content to the client device 109.

At box 230, the client device 109 can reply with, "Congrats, you have pre-qualified offers from ABX, Inc. Should the offers be sent to your email address?" At box 233, the client device 109 can capture a response of, "Yes." Then, the assistant web service 151 can send the promotional offers 150 to the email address of the user. IN some examples, the email address can be obtained from a registered account of the user at the assistant computing environment 106.

Figure 3:
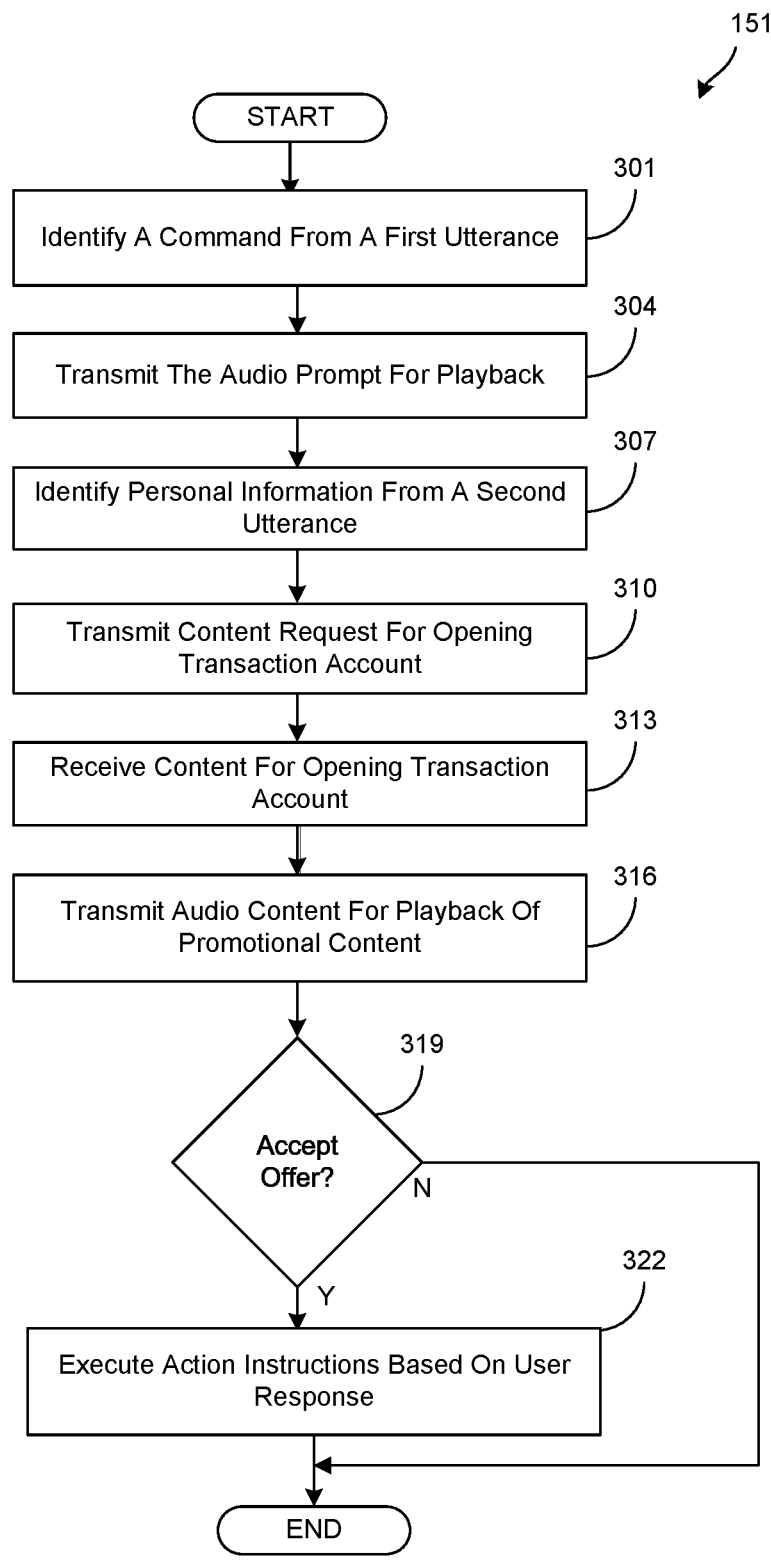
FIG. 3 is a flowchart illustrating one example of functionality implemented as portions of an assistant service executed in a computing environment in the networked environment of FIG. 1 according to various embodiments of the present disclosure.

Referring next to FIG. 3, shown is a flowchart that provides one example of the operation of a portion of the assistant web service 151 according to various embodiments. It is understood that the flowchart of FIG. 3 provides merely an example of the many different types of functional arrangements that may be employed to implement the operation of the portion of the assistant web service 151 as described herein. As an alternative, the flowchart of FIG. 3 may be viewed as depicting an example of elements of a method implemented in the assistant computing environment 106 (FIG. 1) according to one or more embodiments.

Beginning with box 301, the assistant web service 151 can receive an audio of a first utterance from a user. The audio can be received from a voice-enabled service 154, which received the audio from a voice-enabled application 160 executed on the client device 109 of the user. In some embodiments, the assistant web service 151 can perform natural language processing to convert the audio to text. From the text, the assistant web service 151 can identify a command and a keyword associated with the command from the converted text. For example, the initial audio captured can include, "Assistant, please find promotional offers available at the ABC Company." The assistant web service 151 can identify the command "find," the keywords "promotional offers 150," and the keywords "ABC Company."

In some embodiments, the assistant web service 151 can identify that the audio was provided by a particular voice-enabled service 154 (e.g., recognizing an identifier associated with the voice-enabled service 154). The assistant web service 151 can perform a query for instructions associated with the identifier for the particular voice-enabled service 154 based on the keywords. The query can return with an instruction to play an audio prompt that requests the personal information 139 of the user.

In box 304, the assistant web service 151 can transmit the audio prompt to the voice-enabled service 154, which relays the audio prompt to the voice-enabled application 160. The voice-enabled application 160 can playback the audio prompt via the speakers 158.

In box 307, the assistant web service 151 can identify the personal information 139 from a second utterance provided by the voice-enabled service 154. The second utterance can be captured by the client device 109 via the microphone 159. The voice-enabled application 160 can forward the audio to the voice-enabled service 154, which is relayed to the assistant web service 151. The personal information 139 provided can include a first name, a last name, a mailing address, a social security number, financial information, and other suitable personal information 139. In some embodiments, the second utterance is authenticated by performing a vocal match. The assistance web service 151 can extract acoustic features (e.g., vocal characteristics) from the second utterance and compare them against the acoustic features of a verified utterance stored in a user account. If the acoustic features match, the assistant web service 151 can proceed to box 310.

In box 310, the assistant web service 151 can transmit a content request for opening a transaction account to the gateway service 118. In some embodiments, the assistant web service 151 can provide credential to the gateway service 118 for authenticating the assistant web service 151 and/or the voice-enabled service 154. In some embodiments, after authentication, the gateway service 118 can forward the content request to the orchestration service 121. The orchestration service 121 can identify that the content request is for the prospect account service 127.

Upon receipt of the content request, the prospect account service 127 can provide a promotional content based on a credit profile 142 of the user. The prospect account service 127 can obtain the credit profile 142 by querying a credit bureau based on the personal information 139 received from the content request.

In box 313, the assistant web service 151 can receive the promotional content for opening a transaction account from the prospect account service 127 by way of the gateway service 118. The prospect account service 127 can transmit the promotional content to the orchestration service 121, and the orchestration service 121 can provide the promotional content to the gateway service 118.

In box 316, the assistant web service 151 can transmit audio content for playback of the promotional content (e.g., promotional offer 150) to the voice-enabled service 154, which can forward the audio content to voice-enabled application 160. The audio content can be played through the speaker 158 by the client device 109. In some embodiments, the assistant web service 151 can convert the promotional content from text to the audio prompt.

In box 319, the assistant web service 151 can receive the user response from the voice-enabled service 154, which received the user response from the voice-enabled application 160. The assistant web service 151 can process the user response to determine whether one of the items in the promotional content (e.g., promotional offers 150) was accepted or if the user is interested in receiving the promotional content via another communication medium (e.g., via a text message, email etc.). If the user declines (e.g., via the user response), then the assistant web service 151 can proceed to completion. Alternatively, the assistant web service 151 can proceed to box 322 if the user decides to accept an item in the promotional content or if the user requests that the promotional content be sent via another communication medium.

At box 322, the assistant web service 151 can execute action instructions based on the user response. If the user accepts an item in the promotional content (e.g., a promotional offer 150), then the assistant web service 151 can initiate a process for generating a transaction account or activating a service based on the conditions of the promotional content. For example, the assistant web service 151 can transmit a request to the prospective account service to open a transaction account or activate a service.

In other cases, if the user response desires to receive the promotional content in another communication medium, then the assistant web service 151 can transmit an email to the email address of the user. The email can include the promotional content. Then, the assistant web service 151 can proceed to completion.

Figure 4:
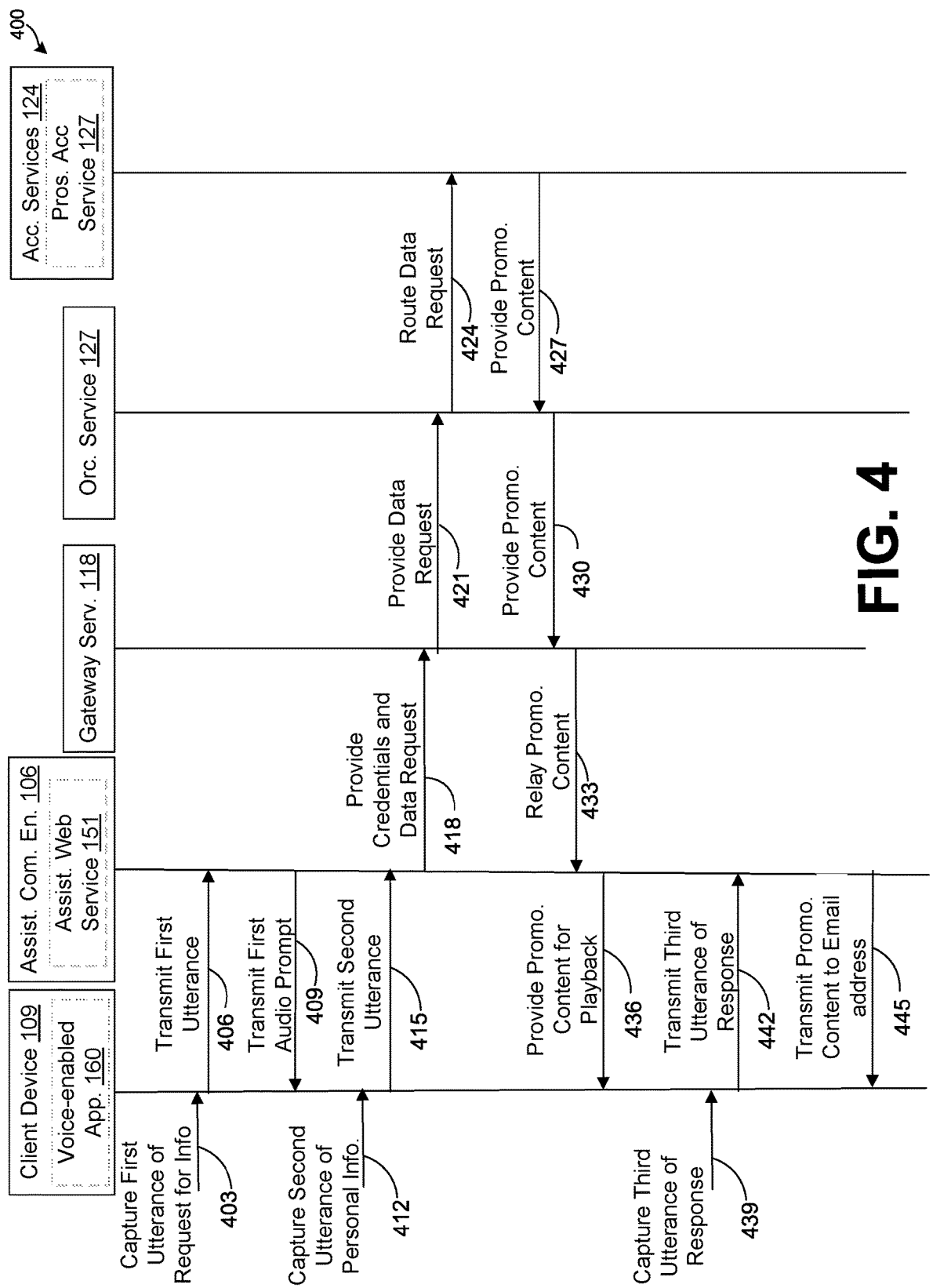
FIG. 4 is a sequence diagram of operations performed in the networked environment of FIG. 1 according to various embodiments of the present disclosure.

With reference to FIG. 4, shown is a sequence diagram 400 of the operations of the components of the networked environment 100. The sequence diagram 400 can represent an alternative embodiment from FIGS. 2 and 3. The sequence diagram 400 relates to using voice-enabled applications for prospect digital acquisition, for example, in scenarios such as activating a new account or a new service.

To begin, at box 403, the client device 109 can capture a first utterance of a user (e.g., user verbally speaking) requesting information about promotional offers 150 with Company ABC. For example, the voice-enabled application 160 executed in the client device 109 can capture a user verbalizing, "Assistant, please look for available promotional offers from Company ABC."

At box 406, the voice-enabled application 160 can transmit the first utterance to the assistant web service 151, which may receive the first utterance by way of the voice-enabled service 154. The assistant web service 151 can process the first utterance using natural language processing techniques to identify a command and a keyword associated with the command. The command can refer to a user intent (e.g., an instruction or a request desired by the user). The keyword can refer to a data element used with the command. In this example, the assistant web service 151 can identify "look" as a command and "promotional offers 150" as keywords. In this embodiment, the first utterance is received from a particular voice-enabled application 160 (e.g., the first utterance sent with a voice-enabled application identifier). The identifier can be used to query a set of commands or a dialogue model for the particular voice-enabled application 160. The query can result in the identification of a first audio prompt for playback using the client device 109. The dialogue model can include a conversion template, which can include potential responses to the client device 109 and potential replies from the client device 109.

At box 409, the assistant web service 151 can transmit the first audio prompt to the voice-enabled application 160. The first audio prompt can cause the voice-enabled application 160 to play, "Please provide your personal information in order to hear about available promotional offers. Please provide the following: First Name, Last Name, and Mailing address." The personal information 139 that is requested can vary.

At box 412, the voice-enabled application 160 can capture a second utterance of the personal information 139 that is verbally communicated by the user, such as the first name, last name, mailing address, social security number, reported yearly income, occupation, and other suitable information.

At box 415, the assistant web service 151 can transmit the second utterance from the voice-enabled application 160. The assistant web service 151 can ensure that required data is collected from the voice-enabled application 160. The assistant web service 151 can generate a data request in preparation for the gateway service 118 of the computing environment 103. The data request can include the personal information 139, the command (e.g., a user intent) to query for promotional content, and other suitable information.

At box 418, the assistant web service 151 can provide an authentication credential to the gateway service 118 for authentication. After the assistant web service 151 has been authenticated, the gateway service 118 can provide the data request to the gateway service 118.

At box 421, the gateway service 118 can provide the data request to the orchestration service 121. In some embodiments, the orchestration service 121 can be omitted. In these embodiments, the gateway service 118 can rout the data request to the appropriate account service 124. When routing the data request, the gateway service 118 can modify or translate the data request in order for the data request to comply with a format of the appropriate account service 124.

At box 424, the orchestration service 121 can route the data request to the appropriate account service 124. In this scenario, the data request can be routed to the prospect account service 127. The orchestration service 121 can identify the prospect account service 127 as the targeted account service 124 based on the command (e.g., the user intent to query for promotional content). The orchestration service 121 can use other methods for routing. Additionally, the orchestration service 121 can modify the data elements and/or the format of the data request in order to comply with the requirements for each account service 124.

The prospect account service 127 can perform a query for promotional content (e.g., promotional offer 150) based on the personal information 139. In some examples, the prospect account service 127 can use the personal information 139 to obtain a credit profile 142. The prospect account service 127 can retrieve the promotional content from the content repository 136 based on various factors related to the user, such as the user's financial situation, credit profile 142, and other suitable factors. For example, the user may pre-qualify for certain promotional offers 150 based on the credit profile 142 of the user, the financial situation of the user, and other information.

In other situations, the promotional content can refer to one or more services that the user may qualify to activate. For example, the prospect account service 127 can retrieve promotional content related to providing the user a particular computing resource, remote cloud storage for a device, additional media content or Internet bandwidth from a telecommunication provider, and other suitable services.

At box 427, the prospect account service 127 can provide the promotional content to the orchestration service 121. In some embodiments, the orchestration service 121 can modify the data from the prospect account services 127 in order to prepare the transmission to the assistant web service 151.

At box 430, the orchestration service 121 can provide the promotional content to the gateway service 118. In some embodiments, the promotional content can be transmitted with an identifier for the voice-enabled application 160 in order to facilitate with directing the promotional content.

At box 433, the gateway service 118 can transmit the promotional content to the assistant web service 151. In some embodiments, the promotional content can be transmitted with an identifier for the voice-enabled application 160 in order to facilitate directing the promotional content.

At box 436, the assistant web service 151 can provide/prepare the promotional content for playback at the voice-enabled application 160 (via the voice-enabled service 154). In some embodiments, the assistant web service 151 can convert the promotional content from text-based to an audio format. The assistant web service 151 can transmit the promotional content to the voice-enabled application 160. In some examples, the assistant web service 151 can receive a dialogue model or an updated dialogue model. In other embodiments, the promotional content can be used with an existing dialogue model.

The promotional content can be transmitted to the voice-enabled application 160 for playback at the client device 109. The promotional content can be played in an audio prompt related to a dialogue model. The audio prompt can state "Congratulations, you are pre-qualified for the multiple promotions. The first promotional offer is a Frequent Flyer credit card with zero annual percentage rate. The second promotional offer is a Premium credit card and it provides access to airport lounges and other several other exclusive perks. Are you interested either of these promotional offers?"

At box 439, the voice-enabled application 160 can capture a third utterance as a user response. The third utterance can include audio of the user saying, "Yes, please send the second offer to my email address."

At box 442, the voice-enabled application 160 can transmit the third utterance to the assistant web service 151. The assistant web service 151 can identify the command "send" and keywords "Yes," "second offer," and "email address."

At box 445, the assistant web service 151 can transmit an email with the second promotional offer 150 to an email address of the user. In other embodiments, the third utterance may include a user instruction to activate or sign up for the second promotional offer 150.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams of FIGS. 2-4 represent the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams of FIGS. 2-4 follow a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams of FIGS. 2-4 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, and/or Z, or any combination thereof (e.g., X; Y; Z; X and/or Y; X and/or Z; Y and/or Z; X, Y, and/or Z, etc.). Thus, such disjunctive language is not generally intended to, and should not, imply that certain embodiments require at least one of X, at least one of Y, and/or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A method, comprising:
   receiving, via at least one computing device associated with an assistant web service, a first utterance from a voice-enabled service, the first utterance comprising a command and the first utterance being associated with a voice-enabled application identifier;

querying, via the at least one computing device associated with the assistant web service, a dialogue model associated with the voice-enabled service to determine an audio prompt for requesting personal information of a user based at least in part on the command and the voice-enabled application identifier, the dialogue model being associated with the voice-enabled application identifier and comprising a dialogue template for identifying the audio prompt based at least in part on the first utterance, the audio prompt being in an audio format associated with the dialogue template;

transmitting, via at least one computing device associated with the assistant web service, the audio prompt for playback to the voice-enabled service, the audio prompt comprising a request for the personal information of the user;

receiving, via the at least one computing device, a second utterance from the voice-enabled service, the second utterance comprising the personal information;

authenticating, via the at least one computing device, the second utterance for a user account based at least in part on a comparison between the second utterance and a verified utterance stored in association with the user account, the comparison comprising an extraction of vocal characteristics from the second utterance;

verifying, via the at least one computing device, the second utterance includes the personal information required for a content request associated with opening a transaction account based at least in part on the dialogue model associated with the voice-enabled application identifier;

generating, via the at least one computing device, the content request for opening the transaction account by modifying data elements associated with the personal information to comply with a format associated with a transact account service;

transmitting, via the at least one computing device, the content request for opening the transaction account to a computing environment associated with a transaction account service based at least in part on the authentication of the second utterance, the content request comprising the personal information;

receiving, via the at least one computing device, content for opening the transaction account from the computing environment, the content being selected based at least in part on a credit profile associated with the personal information;

generating, via the at least one computing device, audio content for playback in the audio format of the dialogue model based at least in part on the content received from the computing environment; and transmitting, via the at least one computing device, the audio content for playback to the voice-enabled service.

2. The method of claim 1, wherein the audio content comprises a plurality of promotional offers associated with opening the transaction account, wherein the plurality of promotional offers are valid for a period of time.

3. The method of claim 1, wherein the second utterance comprises an instruction to transmit the content to an email associated with the user, and further comprising:
transmitting, via the at least one computing device, the content to an email address associated with the user based at least in part on the instruction.

4. The method of claim 1, wherein the at least one computing device comprises:

a gateway service that authenticates data communication with the at least one computing device, the gateway service being configured to route the content request to the transaction account service and route.

5. The method of claim 4, wherein the at least one computing device comprises:
an orchestration service that routes communication from the gateway service to one of a plurality of services based at least in part on the content request, the plurality of services comprising the transaction account service.

6. The method of claim 1, wherein the personal information comprises at least one of a first name, a last name, or a mailing address.

7. The method of claim 1, wherein the second utterance comprises an instruction to select a promotional offer associated with the audio content, and further comprising:
transmitting, via the at least one computing device, a new account request to the computing environment based at least in part on the promotional offer.

8. A system, comprising:
at least one computing device comprising a processor and a memory; and
machine-readable instructions stored in the memory that, when executed by the processor, cause the at least one computing device to at least:
receive a first utterance from a voice-enabled service, the first utterance comprising a command and the first utterance being associated with a voice-enabled application identifier;
query a dialogue model associated with the voice-enabled service to determine an audio prompt for requesting personal information of a user based at least in part on the command and the voice-enabled application identifier, the dialogue model being associated with the voice-enabled application identifier and comprising a dialogue template for identifying the audio prompt based at least in part on the first utterance;
transmit the audio prompt for playback to the voice-enabled service, the audio prompt comprising a request for the personal information of the user;
receive a second utterance from the voice-enabled service, the second utterance comprising the personal information;
authenticate the second utterance for a user account based at least in part on a comparison between the second utterance and a verified utterance stored in association with the user account, the comparison comprising an extraction of vocal characteristics from the second utterance;
identify a credit profile associated with the personal information of the user based at least in part on the authentication of the second utterance;
determine promotional content for opening a transaction account with a transaction account service based at least in part on the credit profile associated with the personal information;
generate audio content for playback in a format associated with the dialogue template based at least in part on the promotional content received from the transaction account service; and
transmit the audio content for playback to the voice-enabled service.

9. The system of claim 8, wherein determining the promotional content comprises querying a content repository using the credit profile.

10. The system of claim 8, wherein the second utterance comprises an instruction to transmit the promotional content to an email associated with the user, and the machine-readable instructions, when executed by the processor, cause the at least one computing device to at least:
   transmit the promotional content to an email address associated with the user based at least in part on the instruction.

11. The system of claim 8, wherein the second utterance comprises an instruction to select a promotional offer associated with the audio content, and the machine-readable instructions stored in the memory that, when executed by the processor, cause the at least one computing device to at least:
   transmit a service activation request to a prospect account service based at least in part on the selection of the promotional offer, wherein the prospect account service activates a computing service that is accessible for a user account.

12. The system of claim 11, wherein the machine-readable instructions, when executed by the processor, cause the at least one computing device to at least:
   authenticate the second utterance that comprises the personal information based at least in part on comparing a first set of acoustic features from the second utterance and a second set of acoustic features from a verified utterance for the user account.

13. The system of claim 8, wherein the second utterance comprises an instruction to select a promotional offer associated with the audio content, and the machine-readable instructions stored in the memory that, when executed by the processor, cause the at least one computing device to at least:
   transmit a new account request to a prospect account service based at least in part on the selection of the promotional offer, wherein the prospect account service generates a new account based on the promotional offer.

14. The system of claim 8, wherein transmitting the audio content for playback to the voice-enabled service further causes the at least one computing device to at least:
   modify the audio content in preparation for transmission to the voice-enabled service.

15. A non-transitory computer-readable medium embodying machine-readable instructions executable in a computing device that, when executed by the computing device, cause the computing device to at least:
   receive a first utterance from a voice-enabled service, the first utterance comprising a command and the first utterance being associated with a voice-enabled application identifier and a command;
   query a dialogue model associated with the voice-enabled service to determine an audio prompt for requesting personal information of a user based at least in part on the command and the voice-enabled application identifier, the dialogue model being associated with the voice-enabled application identifier and comprising a dialogue template for identifying the audio prompt based at least in part on the first utterance, the audio prompt being in an audio format associated with the dialogue template;
   transmit the audio prompt for playback to a voice-enabled service, the audio prompt comprising a request for the personal information of the user;
   receive a second utterance from the voice-enabled service, the second utterance comprising the personal information;
   authenticate the second utterance for a user account based at least in part on a comparison between the second utterance and a verified utterance stored in association with the user account, the comparison comprising an extraction of vocal characteristics from the second utterance;
   verify the second utterance includes the personal information required for a content request associated with opening a transaction account;
   generate the content request for opening the transaction account by modifying data elements associated with the personal information to comply with a format associated with a transact account service
   transmit the content request for opening the transaction account to a computing environment associated with a transaction account service based at least in part on the authentication of the second utterance, the content request comprising the personal information;
   receive content for opening the transaction account from the computing environment, the content being selected based at least in part on a credit profile associated with the personal information;
   generate audio content for playback the audio format of the dialogue model based at least in part on the content received from the computing environment; and
   transmit the audio content for playback to the voice-enabled service.

16. The non-transitory computer-readable medium of claim 15, wherein the audio content comprises a plurality of promotional offers associated with opening the transaction account, wherein the plurality of promotional offers are valid for a period of time.

17. The non-transitory computer-readable medium of claim 15, wherein the second utterance comprises an instruction to transmit the content to an email associated with the user wherein the machine-readable instructions, when executed by the computing device, cause the computing device to at least:
   transmit the content to an email address associated with the user based at least in part on the instruction.

18. The non-transitory computer-readable medium of claim 15, wherein the computing device comprises:
   a gateway service that authenticates data communication with the computing device, the gateway service being configured to route the content request to the transaction account service and route.

19. The non-transitory computer-readable medium of claim 18, wherein the computing device comprises:
   an orchestration service that routes communication from the gateway service to one of a plurality of services based at least in part on the content request, the plurality of services comprising the transaction account service.

20. The non-transitory computer-readable medium of claim 15, wherein the machine-readable instructions, when executed by the computing device, cause the computing device to at least:
   determine whether the user has accepted the content in the audio content based at least in part on a third utterance; and
   execute an action instruction for generating the transaction account.

* * * * *